(12) United States Patent
Jang

(10) Patent No.: US 6,538,710 B1
(45) Date of Patent: Mar. 25, 2003

(54) BACKLIGHT OF A LIQUID CRYSTAL DISPLAY DEVICE HAVING A DEFORMABLE PROJECTING PART FOR SECURELY RETAINING A LIGHT GUIDE WHILE ALLOWING EXPANSION THEREOF

(75) Inventor: Myong Gi Jang, Kyungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/563,336

(22) Filed: May 3, 2000

(30) Foreign Application Priority Data

May 3, 1999 (KR) ............................................. 99-15856

(51) Int. Cl.[7] ............................................. G02F 1/1333
(52) U.S. Cl. .............................. 349/65; 349/58; 362/31
(58) Field of Search ...................... 349/58, 65; 362/26, 362/31

(56) References Cited

U.S. PATENT DOCUMENTS 6,016,175 A  *  1/2000  Kim ............................. 349/58
6,046,785 A  *  4/2000  Won ............................. 349/58

\* cited by examiner

*Primary Examiner*—Robert H. Kim
*Assistant Examiner*—Thoi V Duong
(74) *Attorney, Agent, or Firm*—Birch, Stewart, Kolasch & Birch, LLP

(57) ABSTRACT

In a backlight of a liquid crystal display device, an elastic projecting part is provided in the inner side of an frame surrounding a perimeter of a light guide. The elastic projecting part functions to elastically fix the light guide on a supporting member, so that despite oscillation or external impact, the light guide does not move. Such an arrangement prevents breakage of an enclosure that is caused by external impact, or damage to an optical film that is provided on the upper surface of the light guide. Wrinkling of the optical film, which is caused by deformation of the light guide at high temperature, can be prevented. Also, the light guide does not separate from the supporting member during jarring movement.

9 Claims, 5 Drawing Sheets

BACKLIGHT OF A LIQUID CRYSTAL DISPLAY DEVICE HAVING A DEFORMABLE PROJECTING PART FOR SECURELY RETAINING A LIGHT GUIDE WHILE ALLOWING EXPANSION THEREOF

This application claims the benefit of Korea application No. 1999-15856 filed on May 3, 1999, which is hereby incorporated by reference.

BACKGROUND OF THE INVENTION

1. Field of the Invention

The present invention relates to a backlight of a liquid crystal display device, more particularly to a backlight of a liquid crystal display device for preventing movement of a light guide, by elastically fixing the light guide on an outer frame.

2. Description of the Related Art

Liquid crystal display devices (LCDs) have been widely used as a displays for notebook computers or portable TVs, and they fundamentally include a liquid crystal panel and a backlight to provide a uniform plane of light to the liquid crystal panel. The backlight typically faces a lower surface of a lower substrate, and the liquid crystal panel basically includes an upper substrate, a lower substrate, and a liquid crystal layer between the two substrates. The liquid crystal display is viewed from an upper surface of the upper substrate.

FIG. 1 is a plane view showing a backlight of a general liquid crystal display device, and FIG. 2 is a sectional view taken from A–A' in FIG. 1 also showing the backlight. As shown in figures, according to the related art, the backlight generally includes a light guide 2; an enclosure 4 having a frame 3 surrounding an end of the light guide 2; and a light source 5 provided within the frame 3 and facing the end of the light guide 2.

In the backlight according to the related art, the light guide 2 becomes slightly larger in size at a high temperature due to thermal expansion. Therefore, a gap (g, h) must be formed between the light guide 2 and the enclosure 4, to allow for expansion of the light guide 2 depending on the temperature. Due to this designed gap (g, h), the light guide 2 may move within the enclosure 4. As a result the enclosure 4 can be broken or modified by movement of the light guide 2, if oscillation of and/or impact with the liquid crystal device occurs. Also an optical film (not shown in the figures) provided on upper surface of the light guide 2 may become damaged due to such light guide movement.

SUMMARY OF THE INVENTION

Accordingly, the present invention is directed to a backlight of a liquid crystal display device that substantially obviates one or more problems due to limitations and disadvantages of the related art.

An object of the present invention is to provide a backlight of a liquid crystal display device, wherein a light guide is elastically fixed on an outer frame so that the light guide does not jar against the outer frame in spite of impact and oscillation thereof.

To achieve the objects and in accordance with the purpose of the invention, as embodied and broadly described herein, the backlight of a liquid crystal display device according to an embodiment of the invention includes a light guide; an enclosure having a frame that surrounds a perimeter of the light guide; and an elastic projecting part contacting an end portion of the light guide, within an inner side of the frame facing the light guide.

In accordance with another aspect of the invention, a backlight of a liquid crystal display device includes a light guide; an enclosure contacting the light guide and having a frame that surrounds a perimeter of the light guide; and a projecting part connected to the frame and contacting the light guide, wherein the projecting part securely holds the light guide against the enclosure, while allowing thermal expansion of the light guide.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrates embodiments of the invention and together with description serve to explain the principles of the invention.

In the drawings.

DETAILED DESCRIPTION OF THE INVENTION

Figure 1:
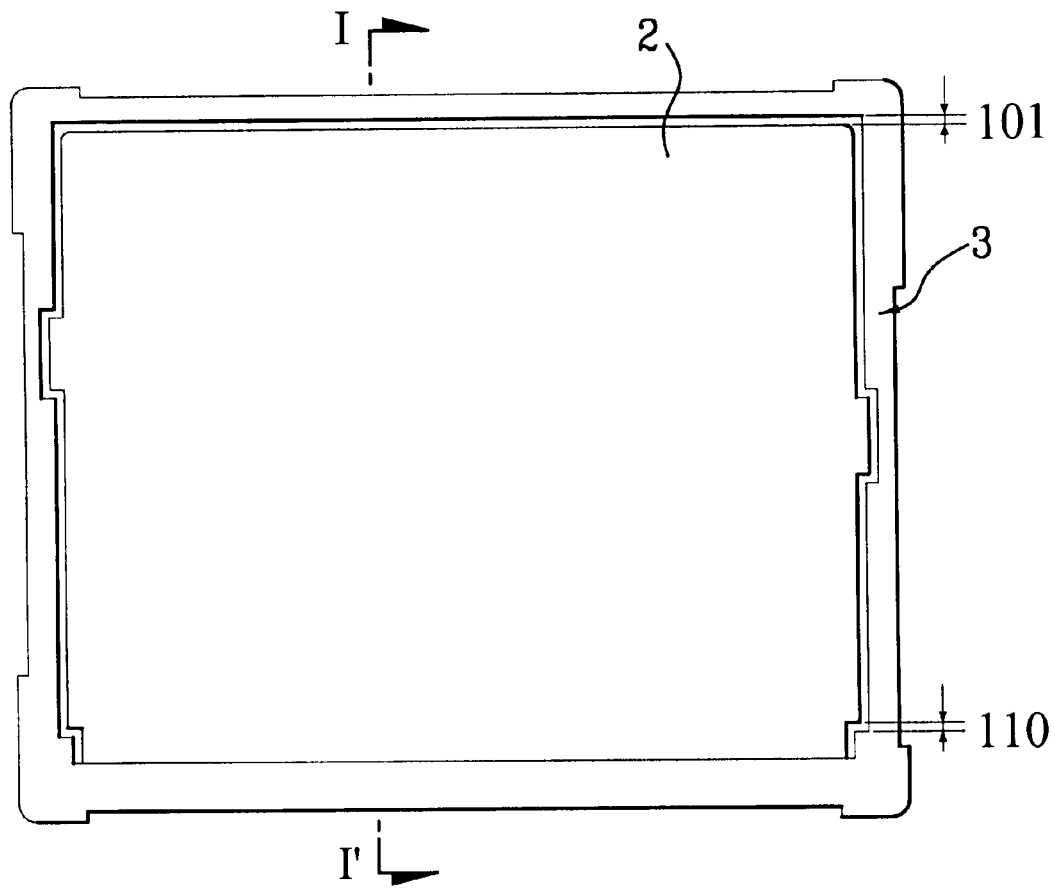
FIG. 1 is a plane view showing the backlight of a liquid crystal display device in the related art.
Figure 2:
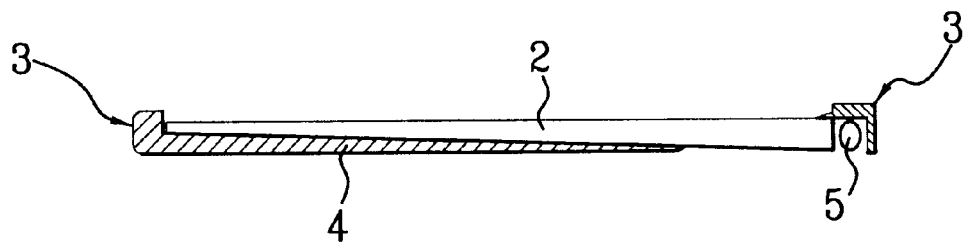
FIG. 2 is a sectional view taken along line A–A' in FIG. 1.

Hereinafter, the backlight of a liquid crystal display device of the present invention is explained in detail by the accompanying drawings. Where common elements are shown, the same reference numerals will be used therefor.

Figure 3:
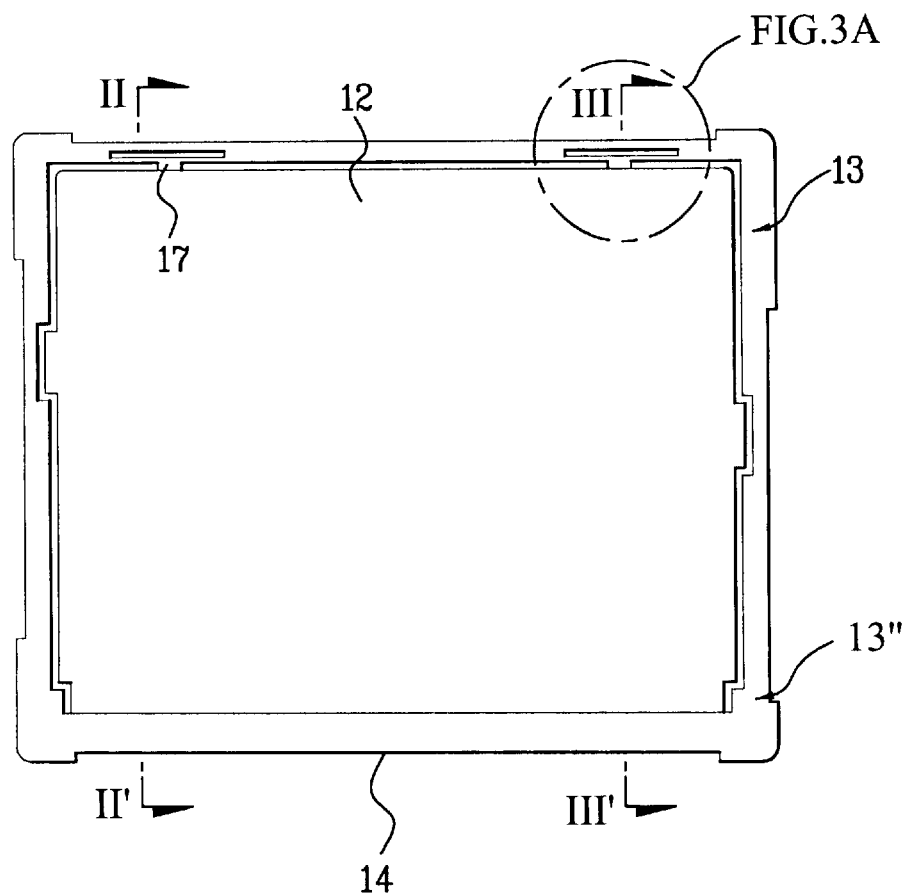
FIG. 3 is a plane view showing the backlight of a liquid crystal display device according to an embodiment of the present invention.
Figure 3A:
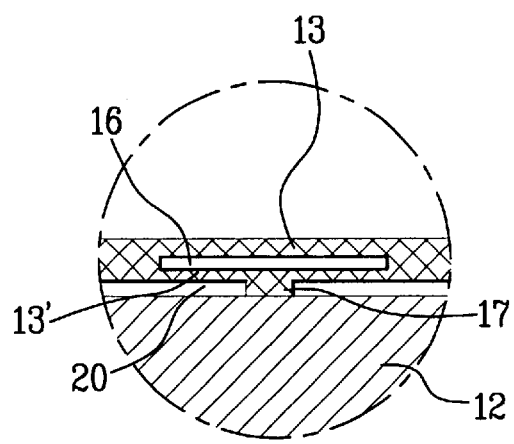
Figure 4:
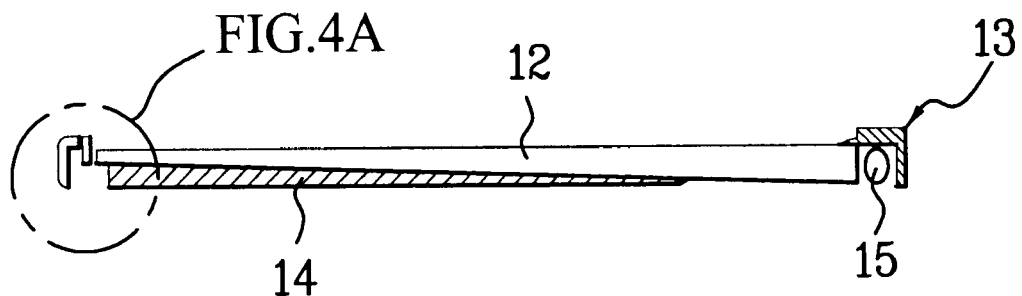
FIG. 4 is a sectional view taken along line B–B' in FIG. 3.
Figure 4A:
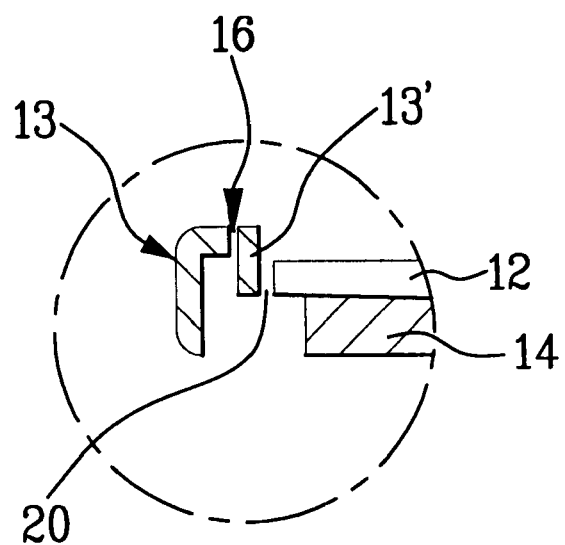
Figure 5:
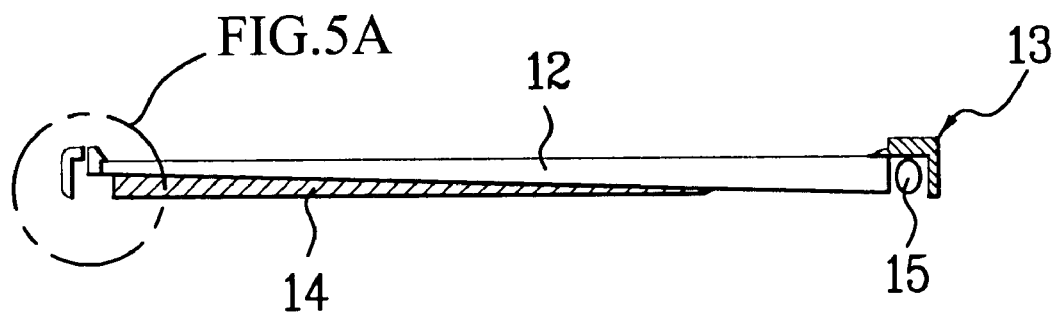
FIG. 5 is a sectional view taken along line C–C' in FIG. 3.
Figure 5A:
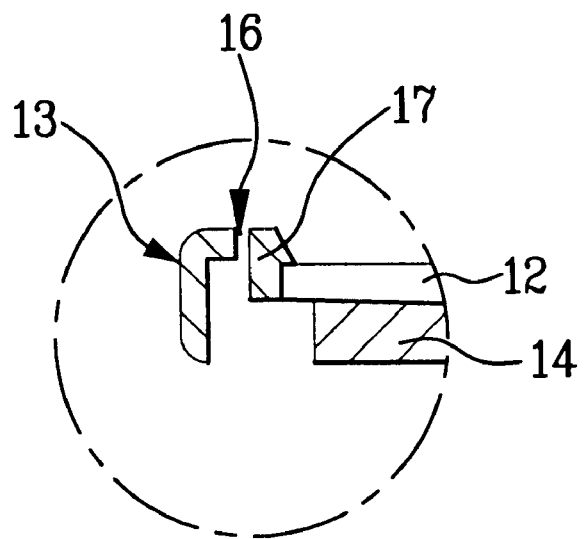
Figure 6:
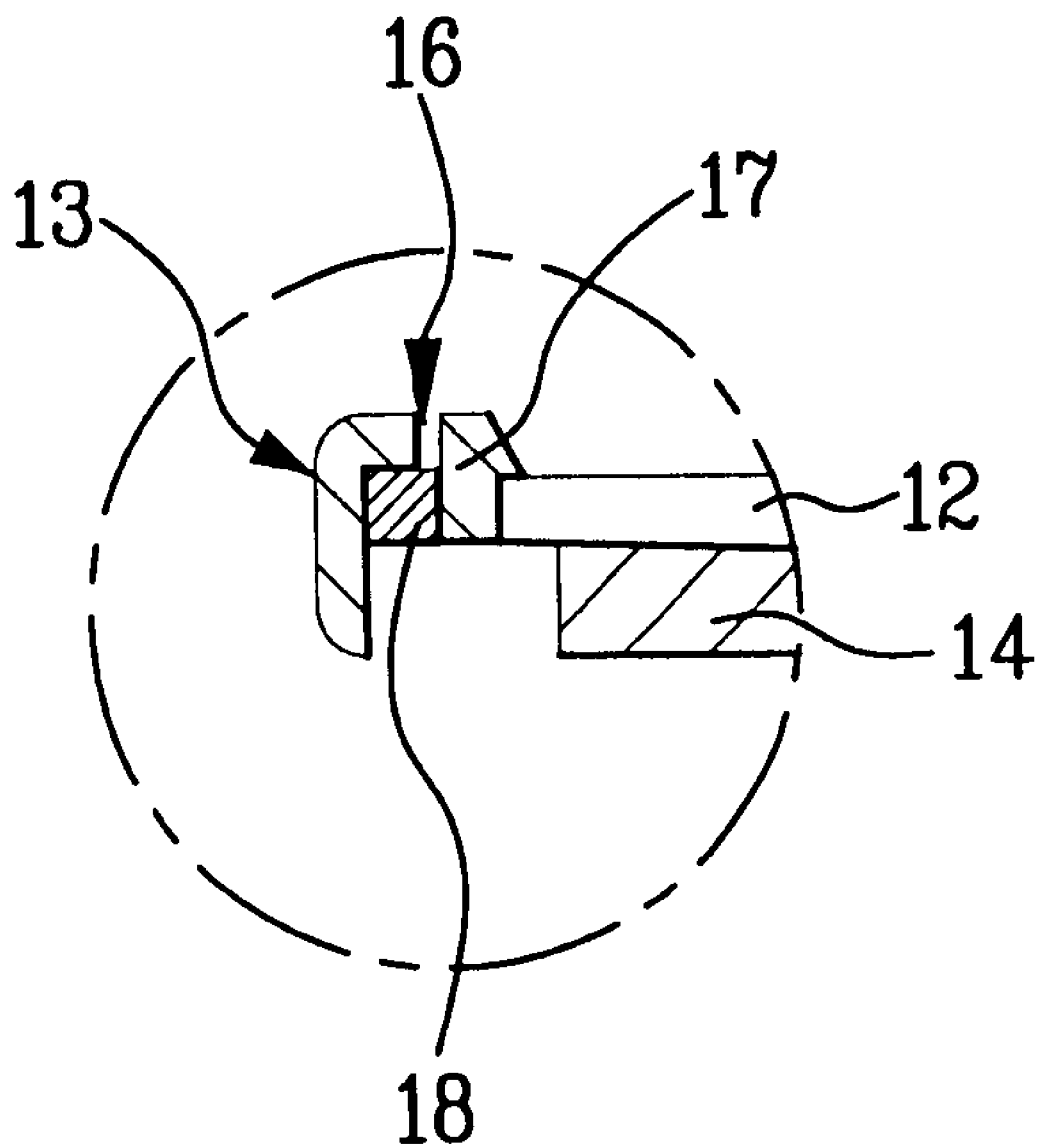
FIG. 6 is a view showing another structure according to the present invention.

FIG. 3 is a plane view showing one embodiment of the present invention. FIG. 4 is a sectional view taken along line B–B' in FIG. 3, and FIG. 5 is a sectional view taken along line C–C' in FIG. 3. As shown in the figures, the backlight of a liquid crystal display device according to the present invention includes a light guide 12, a light source 15, and an enclosure for holding the light guide and light. The enclosure includes a supporting member 14 supporting a lower surface of the light guide 12 and a frame 13 surrounding a portion of the light guide 12. Two elastic projecting parts 17 are formed at a part of the inner side of the frame 13 facing the end portion of the light guide 12. Each plastic projecting part 17 is united with the frame 13 via connecting portion 13' as shown in FIG. 3, and elasticity of these projecting parts is facilitated by a hole 16 which extends through from an upper portion to a lower portion of the frame 13. That is, the presence of the hole 16 allows the elastic projecting part 17 (and connecting portion 13') to deform elastically. The hole 16, as shown in FIG. 3, is formed lengthwise in parallel with the expansion direction of the frame. As may be seen in FIGS. 3 and 4, there is a gap 20 between the connecting portion 13' and the light guide. If the projecting part 17 can elastically deform, holes of all shapes may be formed. For example, several small holes can be formed, extending through from the upper portion of frame 13 to the lower portion of frame 13. Also, in order to reinforce elasticity of the projecting part, as shown in FIG. 6, an elastic material 18 (e.g., a cushion) may be inserted in the holes 16.

As shown in FIG. 4, the light source 15 is provided on the opposite portion of the frame from where the projecting part 17 is formed, and a side of the light guide 12 faces the light source 15.

As shown in the FIG. 5, the projecting part 17 is adjacent with an edge of an upper surface of the light guide 12. Hence, when oscillation and impact occurs, the light guide does not move up and down.

The elastic projecting part 17 functions to securely fix the light guide 12 up against the light 15. In the portion H of FIG. 3, the light guide 12 and supporting member 14 push against each other in opposite directions, and the light guide 12 and supporting member 14 are adjacent, so that the light guide 12 is securely fixed in the enclosure. Therefore, when oscillation and impact occurs, the light guide 12 does not move. The elastic projecting part 17 absorbs any impact so that breakage of the supporting member 14, or damage of an optical film (not shown in the figure) which is provided on the upper surface of the light guide, can be prevented. Also, although the gap between the light guide 12 and the frame 13 is wide, the light guide 12 is securely fixed on the supporting member 14 without movement, enabling such a wide gap. Therefore, wrinkling of the optical film (not shown), which is caused by deformation of the light guide 12 at high temperature, may be prevented.

In the above embodiment, the projecting part 17 is formed in the opposite side of the frame 13 from where the light source 15 is provided, but if the light guide 12 abutted against the opposite side of the frame 13, the projecting part could be provided in any portion of the frame 13. Further, the number of projecting parts 17 may be only one, two as shown in FIG. 3, or more than two.

In the above embodiment, the projecting part 17 is united with the frame 13, and has a hole 16 so that the projecting part 17 is elastically deformable. But the projecting part is composed of elastic material and can be attached in the inner side of the frame 13 by a fixing compound such as an adhesive. Alternately, the projecting part may be attached to the inner side of the frame 13 by a mechanical fastener.

Consequently, since the elastic projecting part plays a role of elastically fixing a light guide on an outer frame, the light guide does not move during oscillation or external impact. The elastic projecting part functions to absorb any impact. As a result, breakage of an outer frame caused by external impact, or damage of an optical film provided on the upper surface of the light guide can be prevented. Also, the light guide is surely fixed on the outer frame without movement, so that the gap between the light guide 12 and the frame 13 can be wide. Therefore, wrinkling of the optical film, which is caused by deformation of the light guide at high temperature, can be prevented. Also, the light guide 12 is surely fixed on the supporting member 14 so that the light guide does not separate therefrom during jarring movement of the backlight or liquid crystal display device.

It will be apparent to those skilled in the art that various modifications can be made in the multi-domain liquid crystal display device and method of manufacturing of the present invention without departing from the sprit or scope of the invention. Thus, it is intended that the present invention covers the modifications and variations of this invention provided they come within the scope of the appended claims and their equivalents.

What is claimed is:

1. A backlight of a liquid crystal display device, comprising:

a light guide;

an enclosure having a frame that surrounds a perimeter of the light guide;

a light source provided on an end of the frame and facing an incident end of the light guide; and an elastic projecting part formed on an opposite end of the frame to the end where the light source is provided, the elastic projecting part contacting an end portion of the light guide, within an inner side of the frame facing the light guide, and the projecting part is unitary with the frame, and the frame includes a recess adjacent to the projecting part so that the projecting part may elastically deform if pushed against by the light guide.

2. The backlight according to claim 1, wherein a top surface of the projecting part is coplanar with a top surface of the frame.

3. The backlight according to claim 1, wherein an elastic material is inserted in the recess to contact the projecting part and the frame.

4. The backlight according to claim 1, the projecting part is composed of an elastic material, and is attached to the frame.

5. The backlight according to claim 1, the projecting part holds the light guide securely against a supporting member of the enclosure.

6. The backlight according to claim 5, the projecting part extends above at least a portion of an upper surface of the light guide.

7. A backlight of a liquid crystal display device, comprising:

a light guide;

an enclosure contacting the light guide and having a frame that surrounds a perimeter of the light guide; and a projecting part connected to the frame and contacting the light guide, the projecting part being at an opposite side of the frame from where a light source is provided, wherein the projecting part securely holds the light guide against the enclosure, while allowing thermal expansion of the light guide, and the frame includes a recess located adjacent to the projecting part into which the projecting part may elastically deform during thermal expansion of the light guide or during jarring of the backlight.

8. The backlight according to claim 7, further comprising:

an elastic piece locates within the recess adjacent to the projecting part.

9. The backlight according to claim 7, wherein the projecting part contacts both an end surface and a top surface of the light guide.

* * * * *